(12) United States Patent
Chang

(10) Patent No.: US 7,411,738 B1
(45) Date of Patent: Aug. 12, 2008

(54) COMPOSITE LENS AND METHOD FOR MANUFACTURING THE SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/769,656

(22) Filed: Jun. 27, 2007

(30) Foreign Application Priority Data

Mar. 14, 2007 (CN) .................. 2007 1 0200283

(51) Int. Cl.
*G02B 3/00* (2006.01)
(52) U.S. Cl. .................. 359/652; 359/653; 359/654; 359/741; 359/796
(58) Field of Classification Search ......... 359/652–654, 359/741, 796
See application file for complete search history.

(56) References Cited

U.S. PATENT DOCUMENTS

| | | | | |
|---|---|---|---|---|
| 4,690,512 A | * | 9/1987 | Forsyth | ...... 359/796 |
| 4,758,071 A | * | 7/1988 | McLaughlin et al. | ...... 359/653 |
| 5,044,737 A | * | 9/1991 | Blankenbecler | ...... 359/653 |
| 5,861,934 A | * | 1/1999 | Blum et al. | ...... 351/169 |
| 6,052,232 A | | 4/2000 | Iwaki | |
| 6,473,238 B1 | * | 10/2002 | Daniell | ...... 359/622 |
| 6,721,101 B2 | * | 4/2004 | Daniell | ...... 359/626 |

* cited by examiner

*Primary Examiner*—Evelyn A. Lester

(57) ABSTRACT

An exemplary composite lens includes a main body and an embedding member. The main body has a first surface and an opposite second surface. The main body has an optical axis associated therewith. The embedding member is disposed in the main body between the first surface and the second surface. A main plane of the embedding member is perpendicular to the optical axis of the main body. A refractive index of a material of the embedding member is higher than that of the main body. The composite lenses can be made thinner. A method for manufacturing the composite lens is also provided.

13 Claims, 8 Drawing Sheets

COMPOSITE LENS AND METHOD FOR MANUFACTURING THE SAME

BACKGROUND

1. Technical Field

The present invention relates to lenses, and more particularly to a composite lens and a method for manufacturing the composite lens.

2. Description of Related Art

Plastic lenses are widely used and are critical components in many optical apparatuses such as lens modules as they can be easily manufactured using molding. Nowadays, plastic lenses play an important role in reducing volumes of optical apparatuses such as lens modules and decreasing numbers of the lenses used in optical apparatuses such as lens modules.

Generally, plastic lenses are made of a typical plastic lens material such as cyclic olefin polymer (COP) and cyclic olefin copolymer (COC). The typical plastic lens material has a refractive index of about 1.5. It is well know to all that a refractive index of a lens material is in inverse ratio to a thickness of a lens. However, the refractive index of the typical plastic lens material is lower, and thus thickness of the plastic lenses made of the typical plastic lens material is still thick to some extend. As the technology has evolved, lens modules have become smaller and thinner, and thus it has become necessary for plastic lenses to become even more thinner and lighter.

What is needed, therefore, is a composite lens with thinner thickness and a method for manufacturing the composite lens.

SUMMARY

One preferred embodiment includes a composite lens. The composite lens includes a main body and an embedding member. The main body has a first surface and an opposite second surface. The main body has an optical axis associated therewith. The embedding member is disposed in the main body between the first surface and the second surface. A main plane of the embedding member is perpendicular to the optical axis of the main body. A refractive index of a material of the embedding member is higher than that of the main body.

Another preferred embodiment provides a method for manufacturing a composite lens. In the method, firstly, an embedding member is attached onto a first molding surface of a first mold part of an injection mold. Secondly, a second mold part of the injection mold is attached to the first mold part of the injection mold to form a molding cavity, thereby fixing the embedding member in the molding cavity between the first molding surface of the first mold part and a second molding surface of the second mold part. Thirdly, a plastic material forming a main body is injected into the molding cavity so as to obtain a composite lens as described above, a refractive index of a material of the embedding member is higher than that of the main body.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below and with reference to the drawings.

Figure 1:
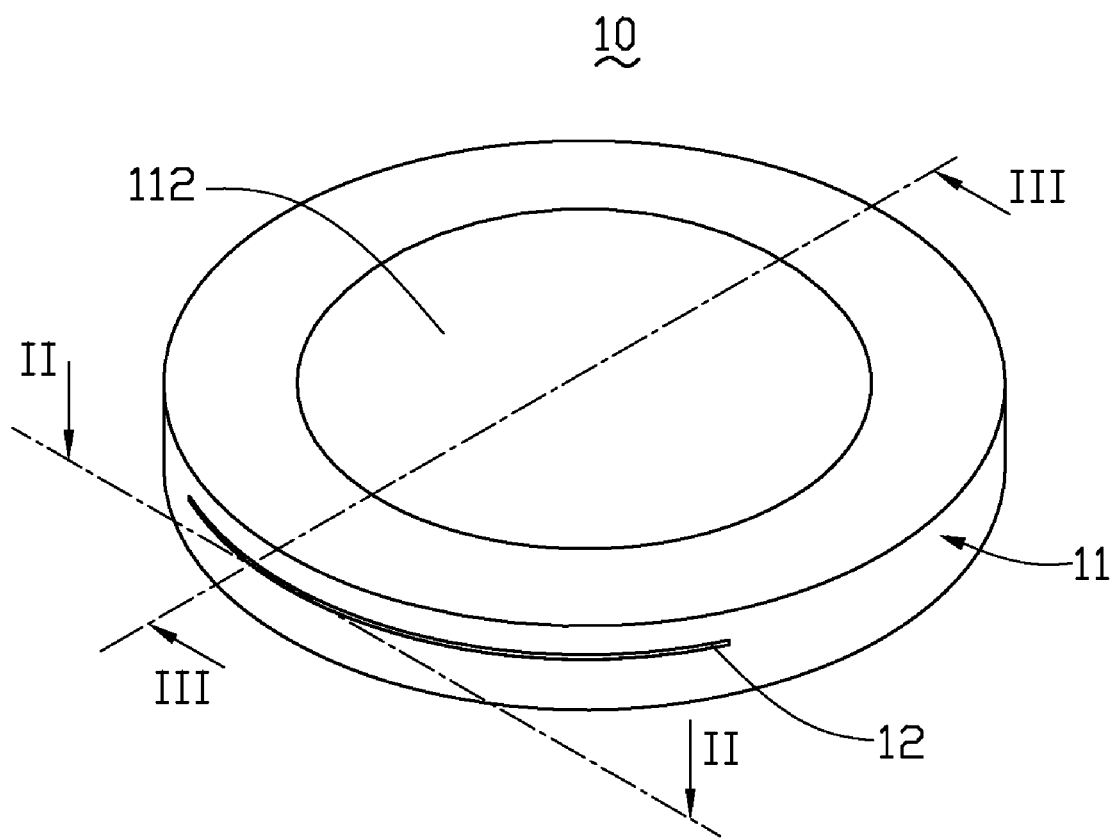
FIG. 1 is a schematic view of a composite lens according to a preferred embodiment.
Figure 2:
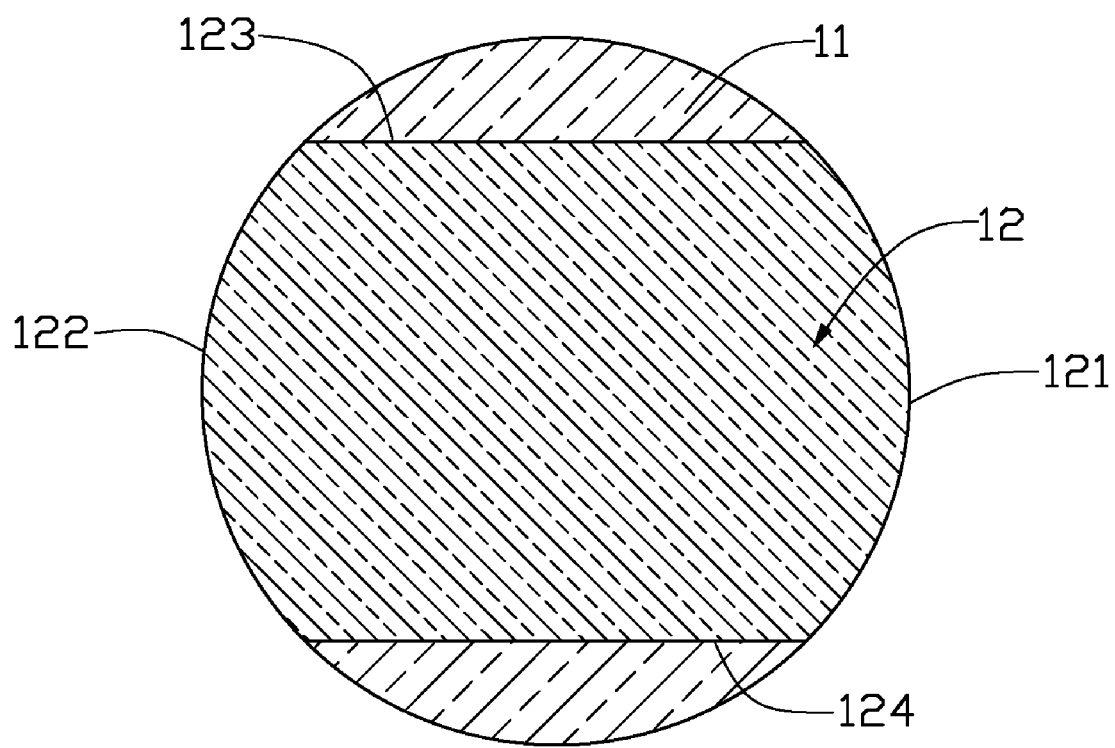
FIG. 2 is a schematic, cross-sectional view the composite lens of FIG. 1 as viewed along line II-II.
Figure 3:
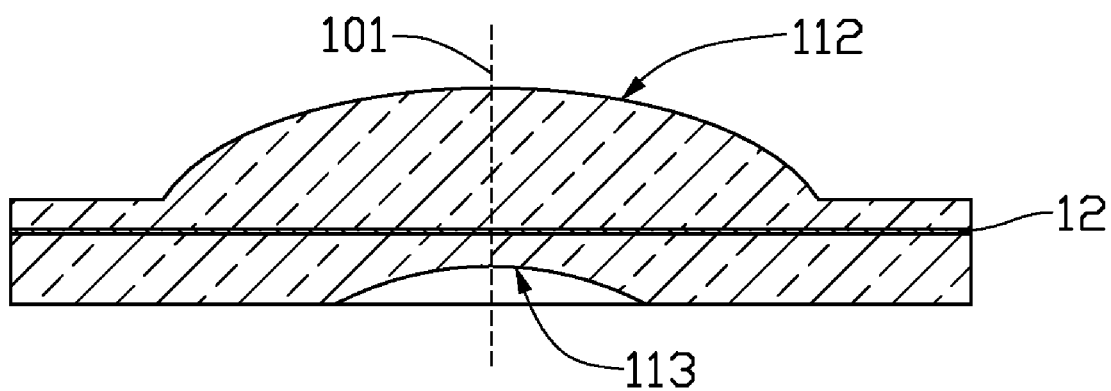
FIG. 3 is a schematic, cross-sectional view the composite lens of FIG. 1 as viewed along line III-III.

Referring to FIGS. 1 to 3, an exemplary composite lens 10, according to a preferred embodiment, includes a main body 11 and an embedding member 12.

The main body 111 has a first surface 112 and an opposite second surface 113. The first surface 112 and the second surface 113 can be aspherical. The first surface 112 and the second surface 113 each have a curved portion. The first surface 112 and the second surface 113 are configured for allowing imaging light to pass through. The main body 11 has an optical axis 101 associated therewith. A material of the main body 11 can be a typical plastic lens material such as cyclic olefin polymer (COP) or cyclic olefin copolymer (COC). A refractive index of the typical lens material is usually about 1.5.

The embedding member 12 is disposed in the main body 11 between the first surface 112 and the second surface 114. A main plane of the embedding member 12 is perpendicular to the optical axis 101 of the main body 11. A projection area of the embedding member 12 on a plane perpendicular to the optical axis 101 is smaller than a projection area of the main body 11 on the plane perpendicular to the optical axis 101 and is larger than a larger one of projection areas of curved portions of the first surface 112 and the second surface 113 on the plane perpendicular to the optical axis 101. Thus, imaging light passing though the lager one of the first surface 112 and the second surface 113 can also pass though the embedding member 12 entirely.

In the preferred embodiment, the projection area of the curved portion of the first surface 112 on the plane perpendicular to the optical axis 101 is larger than the projection area of the curved portion of the second surface 113 on the plane perpendicular to the optical axis 101. The embedding member 12 is strip-shaped. The embedding member 12 has a first edge 121, a second edge 122, a third edge 123 and a forth edge 124. The first edge 121 and the second edge 122 extend to edges of the main body 11 and forms an arc-shape conforming to edges of the main body 11. The third edge 123 and the forth edge 124 are parallel and respectively extend to edges of the first surface 112. Therefore, the embedding member 12 extends through the main body 11. The projection area of the embedding member 12 on the plane perpendicular to the optical axis 101 is smaller than the projection area of the main body 11 on the plane perpendicular to the optical axis 101 and is larger than the projection areas of the curved portion of the first surface 112 on the plane perpendicular to the optical axis 101.

The embedding member 12 is made of a high refractive index material such as glasses and plastics with high refractive indexes. The refractive index of the embedding member 12 can be in an approximate range from 1.7 to 2.0. Thus, the refractive index of the material of the embedding member 12 is higher than that of the main body 11. In the preferred embodiment, the embedding member 12 is a piece of polyimide film with high refractive index. Due to the higher refractive index of the embedding member 12, the main body 11 can be made thinner. Therefore, the composite lens 10 can be made thinner than a lens that is made of a single typical plastic lens material such as COP and COC.

Figure 4:
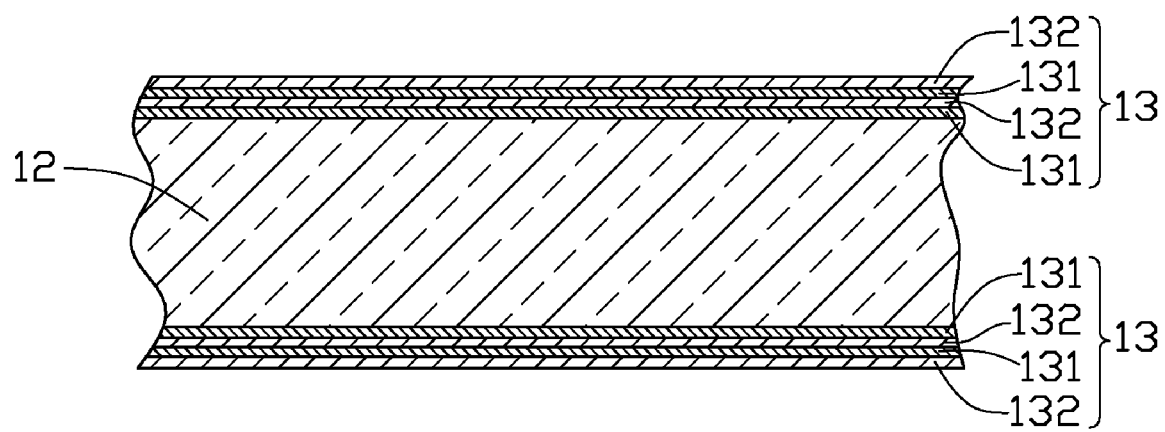
FIG. 4 is partial enlarged schematic view of a composite lens having a gradient refractive index coating.

Additionally, referring to FIG. 4, a gradient refractive index coating 13 can be formed on at least one of opposite surfaces of the embedding member 12. The gradient refractive index coating 13 can include multiple layers. The gradient refractive index coating 13 can comprise a number of titanium dioxide layers 131 and a number of silica dioxide layers 132 alternately stacked one on another. The gradient index gradient coating 13 is configured for gradually changing from the main body 11 with lower refractive index to the embedding member 12 with higher refractive index. In the preferred embodiment, the gradient index gradient coating 13 is formed on the two opposite surfaces of the embedding member 12. The gradient index gradient coating 13 comprises two titanium dioxide layers 131 and two silica dioxide layers 132 alternately stacked one on another.

The composite lens 10 can be formed by an injection molding process.

Figure 5:
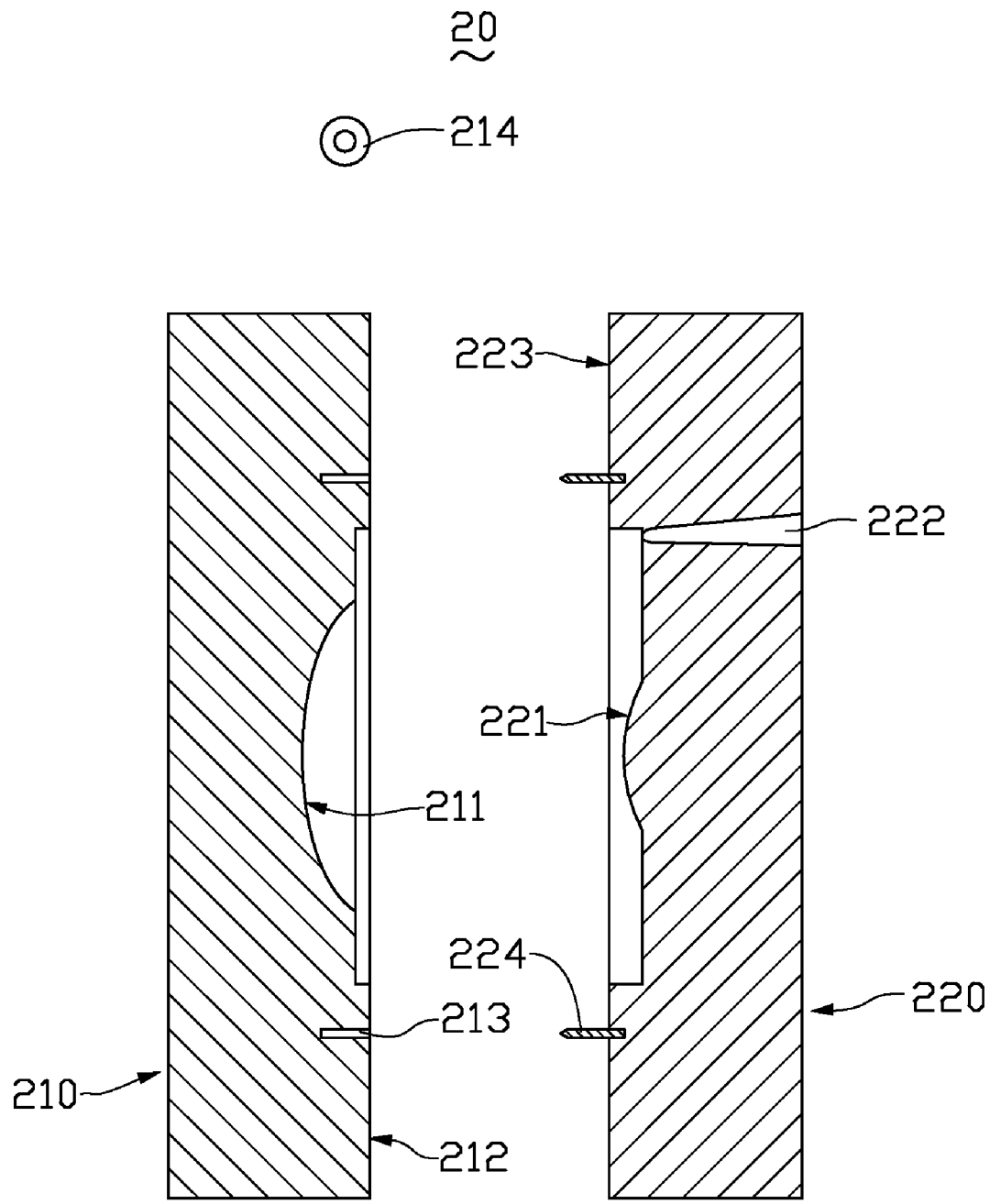
FIG. 5 is schematic view of an injection mold.

Referring to FIG. 5, an injection mold 20 for manufacturing the composite lens 10 includes a first mold part 210 and a second mold part 220.

The first mold part 210 has a first mold core 211 and a first molding surface 212. The first molding surface 212 defines two grooves 213 therein. Two grooves 213 are respectively disposed above and below the first mold core 211. A fastener 214 is disposed above the first mold part 210, and is configured for fixing the embedding member 12 and attaching the embedding member 12 to the first molding surface 212 closely. If the embedding member 12 is a glass plate, the fastener 214 can include a clamp for clamping the glass plate and moving the glass plate to attach to the first molding surface 212. If the embedding member 12 is a piece of plastic film, the fastener 214 can include a rolling device for rolling the plastic film and moving a piece of plastic film to attach to the first molding surface 212 closely. In the preferred embodiment, the embedding member 12 is a piece of polyimide film. The polyimide film has a high refractive index and can be able to bear high temperature of 200 degrees Celsius.

The second mold part 220 has a second mold core 221 and a second molding surface 223. The second mold core 221 is cooperated with the first mold core 221 to form a molding cavity 230. A runner 222 configured for injecting a plastic material is disposed in the second mold part 220. The runner 222 is closed to the edge of the second mold core 221 and communicates with the second mold core 221. Two cutting devices 224 are disposed in the second molding surface 223, and are respectively disposed above and below the second mold core 221. The two cutting devices 224 correspond to the two grooves 213 disposed in the first molding surface 212. The two cutting devices 224 can engage in and cooperate with the two grooves 213. Thus the two cutting devices 224 cannot prevent closing of the first mold part 210 and the second mold part 220, meanwhile, the two cutting devices 221 can cut the embedding member 12.

Figure 6A:
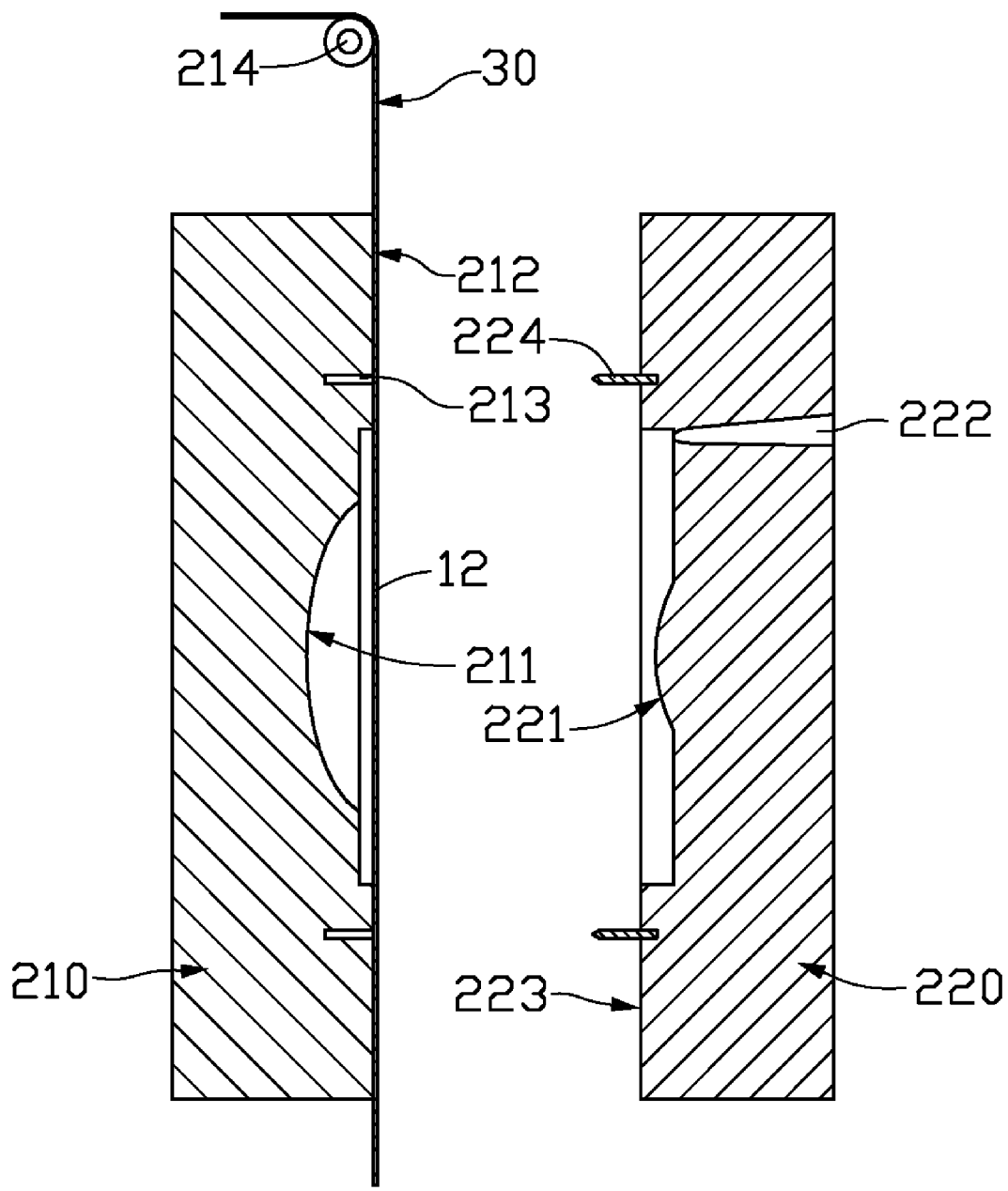
FIGS. 6A-6C are flow schematic views of a method for manufacturing the composite lens using the injection mold of FIG. 4.
Figure 6B:
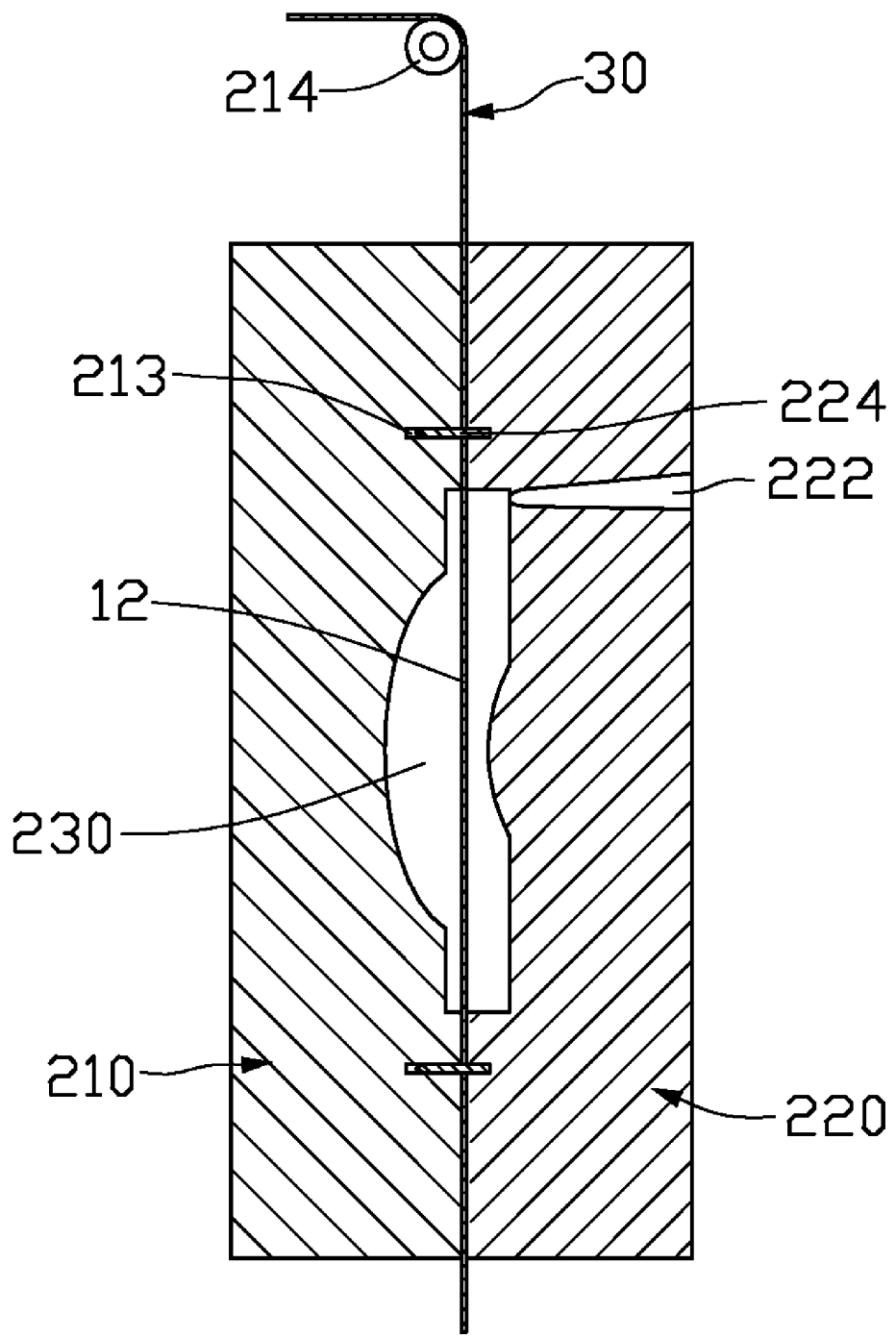
Figure 6C:
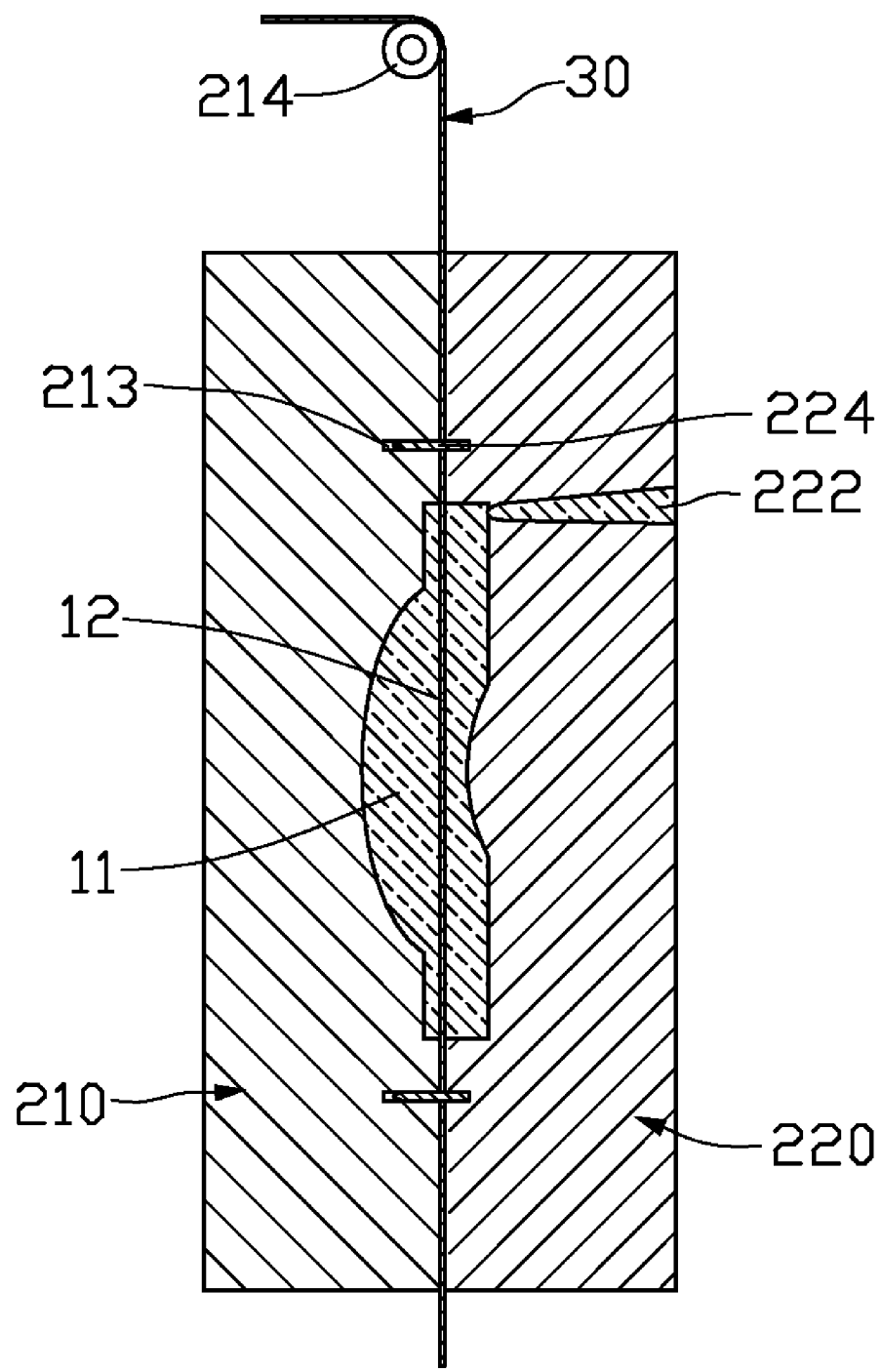

Referring to FIGS. 6A-6C, a method for manufacturing the composite lens 10 includes the following steps.

Step 1: referring to FIG. 6A, the embedding member 12 is attached on the first molding surface 212 of the first mold part 210 of the injection mold 20.

In the preferred embodiment, the embedding member 12 is a piece of polyimide film 30. The fastener 214 includes a rolling device. The fastener 214 rolls to move the plastic film 30 from up to down to attach to the first molding surface 212 closely until a piece of plastic film 30 get over the first mold core 211.

Step 2: referring to FIG. 5B, the second mold part 220 is attached to the first mold part 210 to form a molding cavity 230.

The second mold part 220 and the first mold part 210 are closed to form the molding cavity 230 conformed with a shape of the composite lens 10. When the second mold part 220 and the first mold part 210 are closed, the two cutting devices 224 of the second mold part 220 can engage in and cooperate with the two grooves 213 of the first mold part 210 to cut a piece of plastic film 30 to form the embedding member 12. The embedding member 12 cut from the plastic film 30 can be fixed in the molding cavity 230 between the first molding surface 212 of the first mold part 210 and the second molding surface 223 of the second mold part 220. Because shape and size of the embedding member 12 cut from the plastic film 30 does not conform to that of the molding cavity 230, the embedding member 12 does not separate the molding cavity 230 completely. If the embedding member 12 is a glass plate, the glass plate can be fixed using the fastener 214 including a clamp. When the glass plate has a suitable size, cooperation of the two cutting devices 224 of the second mold part 220 and the two grooves 213 of the first mold part 210 cannot cut the glass plate. The glass plate can also be fixed in the molding cavity 230 between the first molding surface 212 of the first mold part 210 and the second molding surface 223 of the second mold part 220. Shape and size of the glass plate should not conform to that of the molding cavity 230, so that the glass plate does not separate the molding cavity 230 completely.

Step 3: referring to FIG. 6C, a plastic material for forming the main body 11 is injected into the molding cavity 230 so as to obtain the composite lens 10, and the refractive index of the material of the embedding member 12 is higher than that of the main body 11.

When the second mold part 220 is attached to the first mold part 210, the runner 222 communicates with the molding cavity 230. The molten plastic material is a material such as melting COP and melting COC. The refractive index of the molten plastic material is lower than that of the material of the embedding member 12. The molten plastic material can be injected into the molding cavity 230 through the runner 222. Because the embedding member 12 does not separate the molding cavity 230 completely, the molten plastic material can be injected into the whole molding cavity 230 to form the main body 11, thereby forming the composite lens 10. Then the injection mold 20 can be opened to take the composite lens 10 out. Further, edges of the composite lens 10 can be burnished.

Then, the fastener 214 can roll to move the plastic film 30 successively from up to doom until another piece of plastic film 30 gets over the first mold core 211. Thus another composite lens 10 can be manufactured by repeating step 1 to step 3.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A composite lens, comprising:
   a main body having a first surface and an opposite second surface, the main body having an optical axis associated therewith; and
   an embedding member disposed in the main body between the first surface and the second surface, a main plane of the embedding member being perpendicular to the optical axis of the main body, a refractive index of a material of the embedding member is higher than that of the main body.

2. The composite lens as claimed in claim 1, wherein the material of the embedding member is selected from a group consisting of glass and plastic.

3. The composite lens as claimed in claim 1, wherein the first and second surfaces each have a curved portion, a projection area of the embedding member on a plane perpendicular to the optical axis being smaller than a projection area of the main body on the plane perpendicular to the optical axis, and being larger than a larger one of projection areas of the curved portions of the first surface and the second surface on the plane perpendicular to the optical axis.

4. The composite lens as claimed in claim 1, wherein a gradient refractive index coating is formed on at least one of opposite surfaces of the embedding member.

5. The composite lens as claimed in claim 4, wherein the gradient refractive index coating comprises a plurality of titanium dioxide layers and a plurality of silica dioxide layers alternately stacked one on another.

6. The composite lens as claimed in claim 1, wherein the main body is comprised of a material selected from a group consisting of cyclic olefin polymer or cyclic olefin copolymer.

7. The composite lens as claimed in claim 6, wherein the embedding member is comprised of polyimide.

8. The composite lens as claimed in claim 1, wherein the embedding member extends through the main body.

9. A method for manufacturing a composite lens, comprising the steps of:
   attaching an embedding member on a first molding surface of a first mold part of an injection mold;
   attaching a second mold part to the first mold of the injection mold to form a molding cavity, thereby fixing the embedding member in the molding cavity between the first molding surface of the first mold part and a second molding surface of the second mold part; and
   injecting a plastic material for forming a main body into the molding cavity so as to obtain a composite lens as claimed in claim 1, wherein a refractive index of a material of the embedding member is higher than that of the main body.

10. The method as claimed in claim 9, wherein in the step of attaching the embedding member, the embedding member includes a fastener, the embedding member is fixed onto the first molding surface of the first mold part using the fastener.

11. The method as claimed in claim 10, wherein the embedding member is a glass plate and is fixed onto the first molding surface of the first mold part using the fastener, wherein the fastener comprises a clamp configured for clamping the embedding member in place.

12. The method as claimed in claim 10, wherein the embedding member is a plastic film and is conveyed onto the first molding surface of the first mold part using the fastener that comprises a rolling device configured for rolling the embedding member.

13. The method as claimed in claim 9, wherein in the step of attaching a second mold part to the first mold, two cutting devices disposed in the second molding surface of the second mold part cooperate with two grooves defined in the first molding surface of the first mold part to cut the embedding member.

* * * * *